3,415,878
PROCESS FOR THE PRODUCTION OF ALKALI METAL SALTS OF NITRILO TRIACETIC ACID

John A. Gaunt, McIntosh, Ala., assignor to Geigy Chemical Corporation, Greenburgh, N.Y., a corporation of Delaware
No Drawing. Continuation of application Ser. No. 222,617, Sept. 10, 1962. This application Aug. 18, 1965, Ser. No. 480,801
8 Claims. (Cl. 260—534)

ABSTRACT OF THE DISCLOSURE

The process is one which produces an alkali metal salt of NTA and involves the following steps: adding at a constant rate for from about 2 to 4 hours an aqueous mineral acid stabilized, substantially equimolar mixture of hydrogen cyanide and formaldehyde to an aqueous solution of an alkali metal hydroxide and ammonia, said solution containing an excess of about 5% of the alkali metal hydroxide and being maintained at a temperature ranging from about −5 to 5° C., raising the temperature during said addition gradually to about 100° C., boiling the reaction mixture for about 15 minutes and recovering the desired reaction product.

Cross-reference to related application

This application is a continuation of my application, Ser. No. 222,617, filed Sept. 10, 1962, now abandoned.

Detailed disclosure

The present invention relates to a process for the production of alkali metal salts of nitrilo triacetic acid (commonly known at NTA) and, more specifically, to a novel simple one-step process for the manufacture of trisodium nitrilo triacetate.

Briefly, the instant one-step process for making the trisodium salt of NTA is characterized by the addition of an aqueous, mineral acid stabilized mixture of hydrogen cyanide and formaldehyde to an aqueous solution of an alkaline hydroxide and ammonia while carefully controlling the temperature conditions. The reaction involved may be illustrated by the following equation:

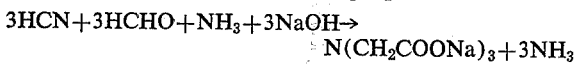

3HCN+3HCHO+NH₃+3NaOH→
   N(CH₂COONa)₃+3NH₃

The reaction of hydrogen cyanide and formaldehyde with ammonia and an alkali metal hydroxide, such as, caustic soda, is very precarious as it can lead to four different reactions forming sodium glycinate, disodium iminodiacetate, trisodium nitrilo triacetate and/or HCN decomposition products in accordance with the following equations:

(1) NH₃+NaOH+HCN+HCHO→
    NH₂CH₂COONa+NH₃
(2) NH₃+2NaOH+2HCN+2HCHO→
    NH(CH₂COONa)₂+2NH₃
(3) NH₃+3NaOH+3HCN+3HCHO→
    N(CH₂COONa)₃+3NH₃
(4) NaOH+HCN+HCHO→decomposition products, such as, sodium carbonate, sodium formate, etc.

Sodium glycinate and disodium iminodiacetate are intermediates in the formation of the subject trisodium nitrilo triacetate. Therefore, if the reaction is carried out at too low a temperature, too much sodium glycinate and disodium iminodiacetate are formed. If, on the other hand, the reaction temperature is too high, HCN decomposition products are obtained. Thus, it is critical, among others, that the temperature conditions in this reaction are carefully controlled and that the HCN-formaldehyde addition is kept constant.

Nitrilo triacetic acid and its alkali metal salts are well known sequestering or chelating agents and as such are considered equivalent in many respects to the more widely used ethylene diamine tetracetic acid (EDTA) and its alkali metal salts. However, due to cheaper raw materials NTA is potentially a cheaper product than EDTA. However, although NTA can be produced in accordance with prior art procedures, an economical, rapid and simple one-step process such as the one described and claimed herein has not yet been achieved.

Some prior art processes involve the preparation in a first step of an intermediate trinitrile which is then hydrolyzed in a second step or the use of glycine which is a relatively expensive starting material. Other known processes which start out with the requisite cyanide product and formaldehyde have, however, been handicapped by the use of sodium cyanide and by the necessity, in order to avoid undesired hydrolysis, of adding the sodium cyanide and formaldehyde separately and alternately and in closely controlled amounts continuing this step-wise procedure until complete carboxymethylation of the ammonia is accomplished. Also, shipment of hydrogen cyanide is cheaper than shipment of aqueous sodium cyanide, since the maximum concentration that is practical with the sodium salt is about 40%, the remainder being water. This circumstance contributes to the superior economic feasibility of the process according to the present invention which uses hydrogen cyanide directly.

An object of the present invention is, therefore, an embodiment of a process which is free of the deficiencies and shortcomings of the prior art processes. Another object is a process which yields optimum amounts of the desired reaction product with only minimal amounts of undesired reaction products. Still another object is the provision of a simple, economical and rapid one-step process for the production of trisodium nitrilo triacetate. Other objects will become apparent from the disclosures hereinafter.

These objects are realized by a first process which involves the addition of an aqueous mineral acid-stabilized, substantially equimolar mixture of hydrogen cyanide and formaldehyde to an aqueous solution of an alkali metal hydroxide, preferably sodium hydroxide, and ammonia, which solution is being maintained at an initial temperature ranging between about −5 and 5° C. This addition to the reaction mass which is maintained at a pH of about 13 to 14, must be carried out at a constant and uniform rate within about 2 to 4 hours and the temperature during this period of addition is gradually raised to about 100° C. The reaction mixture is then boiled for about fifteen minutes whereupon the desired reaction product can be recovered.

The above objects of the present invention are also accomplished by a second process which involves the addition of an aqueous mineral acid-stabilized mixture of hydrogen cyanide and formaldehyde, the hydrogen cyanide being in excess by about 10 to 20%, to an aqueous solution of ammonia and an alkali metal hydroxide, preferably sodium hydroxide. This addition to the reaction mass which is maintained at a temperature of about 40 to 55° C. and at a pH of about 13 to 14, takes place in about 2 to 4 hours. The temperature is then raised to about 100 to 105° C. with further addition of sufficient formaldehyde so as to eliminate the excess hydrogen cyanide. The desired reaction product can then be recovered.

According to this second process an excess of about 10 to 20% of hydrogen cyanide over formaldehyde must be employed for a lower excess gives a high proportion of disodium iminodiacetate while an excess above 20% of hydrogen cyanide renders the procedure virtually a two-step method, the second formaldehyde addition being very significant.

Further, it is very important in the practice of this second process to maintain the temperature at about 40 to 55° C., preferably between about 45 to 50° C., during the addition of the mixture of hydrogen cyanide and formaldehyde to the solution of ammonia and sodium hydroxide because below the temperature of 40° C. deep colored products tend to be formed while at temperatures higher than 55° C. the yields tend to become lower.

Moreover, in the practice of this invention according to both processes it is very important that, on the one hand, at least a slight excess of caustic soda, preferably about 5%, is present over the theoretical amount to insure a more complete and rapid hydrolysis of intermediate products, but that, on the other hand, no excess of formaldehyde be present lest dark colored products be formed. To insure absence of an excess of formaldehyde, a slight excess of hydrogen cyanide must be employed.

The product of the subject process, the trisodium nitrilo triacetate, can be converted into NTA proper according to the following equation:

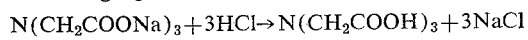

$$N(CH_2COONa)_3 + 3HCl \rightarrow N(CH_2COOH)_3 + 3NaCl$$

The methods of this invention will be described in greater detail in the following illustrative examples. The scope of the invention is, however, not limited thereto. Temperatures therein are given in degrees centigrade.

EXAMPLE 1

A reactor was charged with 542 parts of water followed by a charge of 572.9 parts (71.61 moles) of 50% caustic soda. The reactor was then cooled with brine on jacket to 25° at which time 121.6 parts of 28% aqueous ammonia were added and the vessel cooled to 0 to 5°. The hydrogen cyanide-formaldehyde mixture [167.3 parts of 99.5% hydrogen cyanide (61.65 moles) and 476.5 parts of 37% formaldehyde (58.71 moles), stabilized with 3 parts of 40% sulfuric acid] was added to the solution in the reaction vessel at a uniform rate of 3.2 parts per minute, maintaining the temperature in the vessel approximately according to the following table by means of brine at first and then by steam:

| | Temperature, degrees |
|---|---|
| At start of HCN addition | About 0 |
| 10 min. after start | About 0–5 |
| 20 min. after start | About 4–9 |
| 30 min. after start | About 8–13 |
| 40 min. after start | About 13–18 |
| 50 min. after start | About 18–23 |
| 60 min. after start | About 23–28 |
| 1 hr. 10 min. after start | About 28–32 |
| 1 hr. 20 min. after start | About 32–37 |
| 1 hr. 30 min. after start | About 37–41 |
| 1 hr. 40 min. after start | About 40–46 |
| 1 hr. 50 min. after start | About 45–51 |
| 2 hr. 0 min. after start | About 50–56 |
| 2 hr. 10 min. after start | About 55–61 |
| 2 hr. 20 min. after start | About 60–66 |
| 2 hr. 30 min. after start | About 65–71 |
| 2 hr. 40 min. after start | About 70–76 |
| 2 hr. 50 min. after start | About 75–81 |
| 3 hr. 0 min. after start | About 80–86 |
| 3 hr. 10 min. after start | About 85–91 |
| 3 hr. 20 min. after start | About 90–94 |
| At end of HCN addition | About 93–97 |

When all of the hydrogen cyanide-formaldehyde mixture was added, the reactor was heated to boiling and boiled for about 15 minutes. Then excess cyanide and ammonia were removed by addition of 45 parts (0.55 mole) of formaldehyde and continued heating and after removal of excess cyanide the reaction product was cooled to 60° and .18 part of hydrogen peroxide 35% was added and the mixture agitated for 15 minutes whereupon another .17 part of hydrogen peroxide 35% was added and again agitation carried out for 20 minutes. Then .08 part of charcoal (DARCO S–51) was added, agitation for 20 minutes was carried out and the mixture was recirculated through a filter until it was clear. Yield: 435.2 parts of the subject product or 82.4% of theory based on HCN.

EXAMPLE 2

A mixture of 115 parts of water, 24.5 parts of 28% ammonia and 115 parts of 50% caustic soda was cooled to −2° in a jacketed stainless steel reactor fitted with agitator and ammonia absorption system. A mixture of 97.5 parts of 37% formaldehyde, 34.5 parts of 99.5% hydrogen cyanide and 0.5 part of 50% sulfuric acid was added in four hours at a uniform rate. The reaction temperature was allowed to increase at a uniform rate so that at the end of the addition of the hydrogen cyanide-formaldehyde mixture, the reaction temperature was 95°. The solution was then heated to 105° and 6 parts of 37% formaldehyde was added to remove all traces of cyanide. The yield was 266 parts of the desired material or 82.9% of theory based on HCN.

Analysis

| | Percent |
|---|---|
| Trisodium nitrilo triacetate (M.W. 257) | 33.6 |
| Disodium iminodiacetate (M.W. 177) | 1.5 |
| Sodium glycinate (M.W. 97) | 0.1 |

EXAMPLE 3

The experiment of Example 2 was repeated except that the initial temperature of the reaction mixture was 5° instead of −2°. Yield: 273 parts or 87.3% of theory based on HCN.

Analysis

| | Percent |
|---|---|
| Trisodium nitrilo triacetate (M.W. 257) | 35.2 |
| Disodium iminodiacetate (M.W. 177) | 0.1 |
| Sodium glycinate (M.W. 97) | 0.2 |

EXAMPLE 4

Into a reactor was charged 115 parts of water, 24.5 parts of 28% ammonia (0.4 mole) and 115 parts of 50% caustic soda (1.44 mole). This solution was maintained at 45–50° while a mixture of 97.5 parts of 37% formaldehyde (1.2 mole) and 37.5 parts of 99.5% HCN (1.38) was added in two hours. The solution was then heated to 100° and 15.5 parts of 37% formaldehyde was slowly added. The solution was then boiled to remove traces of ammonia, cooled to 60° and decolorized with hydrogen peroxide. Yield: 271 parts or 80.5% yield of theory based on HCN.

Analysis

| | Percent |
|---|---|
| Trisodium nitrilo triacetate (M.W. 257) | 35.0 |
| Disodium iminodiacetate (M.W. 177) | 2.83 |
| Sodium glycinate (M.W. 97) | 0.09 |

EXAMPLE 5

Caustic soda (50%, 290 parts, 3.63 moles), ammonia (29%, 59 parts, 1 mole) and 290 parts of water were mixed and heated to 40°. The solution was agitated and maintained by cooling to 40° during the three-hour addition of a mixture of 89.5 parts (3.30 moles) of hydrogen cyanide 100% (10% excess) and 243 parts (3 moles) of 37% formaldehyde (which was stabilized with 2 parts of 25% sulfuric acid). The solution was heated to 100 to 105° and 24.3 parts of 37% formaldehyde was slowly added. The solution was boiled until no more ammonia was evolved. Yield: 640 parts or 79% of theory based on HCN.

Analysis

| | Percent |
|---|---|
| Trisodium nitrilo triacetate (M.W. 257) | 34.9 |
| Disodium iminodiacetate (M.W. 177) | 3.6 |
| Sodium glycinate (M.W. 97) | 0.4 |

EXAMPLE 6

The above experiment was repeated except that the initial charge of HCN was increased to 93.5 parts (15% excess) and the final charge of formaldehyde was 36.5 parts. Yield: 660 parts or 81.1% of theory based on HCN.

Analysis

| | Percent |
|---|---|
| Trisodium nitrilo triacetate (M.W. 257) | 36.4 |
| Disodium iminodiacetate (M.W. 177) | 1.9 |
| Sodium glycinate (M.W. 97) | 0.4 |

EXAMPLE 7

The experiment of Example 4 was repeated except that the initial charge of HCN was increased to 98 parts (20% excess) and the final charge of formaldehyde was 48 parts. Yield: 665 parts or 80.7% of theory based on HCN.

Analysis

| | Percent |
|---|---|
| Trisodium nitrilo triacetate (M.W. 257) | 37.5 |
| Disodium iminodiacetate (M.W. 177) | 0.6 |
| Sodium glycinate (M.W. 97) | 0.2 |

EXAMPLE 8

The experiment of Example 4 was repeated except that the reaction temperature was 50–55° instead of 40°. The yield was 715 parts or 78.8% of theory based on HCN.

Analysis

| | Percent |
|---|---|
| Trisodium nitrilo triacetate (M.W. 257) | 34.0 |
| Disodium iminodiacetate (M.W. 177) | 0.4 |
| Sodium glycinate (M.W. 97) | 0.1 |

EXAMPLE 9

Preparation of NTA.—A reaction vessel was charged with 19.28 parts of a 34% solution trisodium nitrilo triacetate. Hydrochloric acid (31.5%) was added until the solution was no longer alkaline to Mimosa paper. With steam on the jacket the solution was heated to 80° and the remaining total charge of approximately 30 parts of the hydrochloric acid was rapidly added so that the pH of the suspension was 1.7 to 1.9. The suspension was then cooled to 50° and allowed to precipitate for 5–6 hours. Filtration and washing on a porous stone filter concluded the procedure. Yield of NTA: 13.76 parts or 96% of theory.

What is claimed is:

1. A process for producing an alkali metal salt of nitrilo triacetic acid which comprises adding at a constant rate for from about 2 to 4 hours an aqueous mineral acid-stabilized, substantially equimolar mixture of hydrogen cyanide and formaldehyde to an aqueous solution of an alkali metal hydroxide and ammonia, said solution containing an excess of about 5% of the alkali metal hydroxide and being maintained at an initial temperature ranging from about −5 to 5° C., raising during said addition the temperature of the reaction mass gradually to about 100° C., while maintaining a pH of about 13 to 14, boiling the reaction mixture for about 15 minutes and recovering the desired reaction product.

2. A process for producing trisodium nitrilo triacetate which comprises adding at a constant rate for from about 2 to 4 hours an aqueous mineral acid-stabilized, substantially equimolar mixture of hydrogen cyanide and formaldehyde to an aqueous solution of a sodium hydroxide and ammonia, said solution containing an excess of about 5% of sodium hydroxide and being maintained at an initial temperature ranging from about −5 to 5° C., raising during said addition the temperature of the reaction mass gradually to about 100° C., while maintaining a pH of about 13 to 14, boiling the reaction mixture for about 15 minutes and recovering the desired reaction product.

3. A process for producing an alkali metal salt of nitrilo triacetic acid which comprises adding at a constant rate for from about 2 to 4 hours an aqueous mineral acid-stabilized, substantially equimolar mixture of hydrogen cyanide and formaldehyde to an aqueous solution of an alkali metal hydroxide and ammonia, said solution containing an excess of about 5% of the alkali metal hydroxide and being maintained at an initial temperature ranging from about −5 to 5° C., raising during said addition the temperature of the reaction mass gradually to about 100° C., while maintaining a pH of about 13 to 14, boiling the reaction mixture for about 15 minutes, adding under continued heating sufficient formaldehyde to remove any unreacted alkali metal cyanide and ammonia, cooling the reaction product to about 60° C., adding hydrogen peroxide and charcoal under agitation to decolorize the reaction product and filtering the reaction product.

4. A process for producing a trisodium nitrilo triacetate which comprises adding at a constant rate for from about 2 to 4 hours an aqueous mineral acid-stabilized, substantially equimolar mixture of hydrogen cyanide and formaldehyde to an aqueous solution of sodium hydroxide and ammonia, said solution containing an excess of about 5% of the sodium hydroxide and being maintained at an initial temperature ranging from about −5 to 5° C., raising during said addition the temperature of the reaction mass gradually to about 100° C., while maintaining a pH of about 13 to 14, boiling the reaction mixture for about 15 minutes, adding under continued heating sufficient formaldehyde to remove any unreacted soduim cyanide and ammonia, cooling the reaction product to about 60° C., adding hydrogen peroxide and charcoal under agitation to decolorize the reaction product and filtering the reaction product.

5. A process for producing an alkali metal salt of nitrilo triacetic acid which comprises adding at a constant rate for from about 2 to 4 hours an aqueous mineral acid stabilized mixture of hydrogen cyanide and formaldehyde, said mixture containnig an excess of 10 to 20% of hydrogen cyanide, to an aqueous solution of ammonia and an alkali metal hydroxide, said solution containing an excess of about 5% of the alkali metal hydroxide, maintaining during said addition the reaction mass at a temperature of 40 to 55° C., and at a pH of about 13 to 14, raising the temperature to 100 to 105° C., adding sufficient formaldehyde to eliminate the excess hydrogen cyanide and recovering the desired reaction product.

6. A process for producing trisodium nitrilo triacetate which comprises adding at a constant rate for from about 2 to 4 hours an aqueous mineral acid stabilized mixture of hydrogen cyanide and formaldehyde, said mixture containing an excess of 10 to 20% of hydrogen cyanide, to an aqueous solution of ammonia and sodium hydroxide, said solution containing an excess of about 5% of sodium hydroxide, maintaining during said addition the reaction mass at a temperature of 40 to 55° C. and at a pH of about 13 to 14, raising the temperature to 100 to 105° C., adding sufficient formaldehyde to eliminate the excess hydrogen cyanide and recovering the desired reaction product.

7. A process for producing an alkali metal salt of nitrilo triacetate acid which comprises adding at a constant rate for from about 2 to 4 hours an aqueous mineral acid-stabilized mixture of hydrogen cyanide and formaldehyde, said mixture containing an excess of 10 to 20% of hydrogen cyanide, to an aqueous solution of ammonia and an alkali metal hydroxide, said solution containing an excess of about 5% of the alkali metal hydroxide, maintaining during said addition the reaction mass at a temperature of from 40 to 55° C. and at a pH of about 13 to 14, raising the temperature to 100 to 105° C., adding slowly sufficient formaldehyde to remove the excess hydrogen cyanide, boiling the solution to remove unreacted ammonia, cooling the reaction product to about 60° C., adding hydrogen peroxide and charcoal under agitation to decolorize the reaction product and filtering the reaction product.

8. A process for producing a trisodium nitrilo triacetate which comprises adding at a constant rate for from about 2 to 4 hours an aqueous mineral acid-stabilized mixture of hydrogen cyanide and formaldehyde, said mixture containing an excess of 10 to 20% of hydrogen cyanide, to an aqueous solution of ammonia and sodium hydroxide, said solution containing an excess of about 5% of the sodium hydroxide, maintaining the reaction mass during said addition at a temperature of 40 to 55° C. and at a pH of about 13 to 14, raising the temperature to 100 to 105° C., adding slowly sufficient formaldehyde to remove the excess hydrogen cyanide, boiling the solution to remove unreacted ammonia, cooling the reaction product to about 60° C., adding hydrogen peroxide and charcoal under agitation to decolorize the reaction product and filtering the reaction product.

References Cited

UNITED STATES PATENTS

| | | | |
|---|---|---|---|
| 2,407,645 | 9/1946 | Bersworth | 260—534 |
| 2,855,428 | 10/1958 | Singer | 260—534 |
| 2,860,164 | 11/1958 | Kroll | 260—534 |
| 2,890,386 | 6/1959 | Sexton | 260—534 XR |
| 3,183,262 | 5/1965 | Singer et al. | 260—534 |

LORRAINE A. WEINBERGER, *Primary Examiner.*

A. P. HALLUIN, *Assistant Examiner.*